US012800280B2

(12) United States Patent
Salvana

(10) Patent No.: US 12,800,280 B2
(45) Date of Patent: Nov. 17, 2026

(54) MULTI-PURPOSE MEASURING TOOL

(71) Applicant: Gerardo Salvana, Edmonton (CA)

(72) Inventor: Gerardo Salvana, Edmonton (CA)

( * ) Notice: Subject to any disclaimer, the term of this patent is extended or adjusted under 35 U.S.C. 154(b) by 204 days.

(21) Appl. No.: 18/965,195

(22) Filed: Dec. 2, 2024

(65) Prior Publication Data

US 2026/0153318 A1 Jun. 4, 2026

(51) Int. Cl.

*G01B 3/10* (2020.01)
*G01B 3/1046* (2020.01)
*G01B 3/1056* (2020.01)
*G01B 3/1089* (2020.01)
*G01B 3/1092* (2020.01)

(52) U.S. Cl.

CPC ......... *G01B 3/1092* (2020.01); *G01B 3/1046* (2020.01); *G01B 3/1056* (2013.01); *G01B 3/1089* (2020.01)

(58) Field of Classification Search

CPC .. G01B 3/1046; G01B 3/1056; G01B 3/1089; G01B 3/1092
USPC ........................... 33/758, 759, 760, 768, 770
See application file for complete search history.

(56) References Cited

U.S. PATENT DOCUMENTS 1,303,756 A * 5/1919 Ballou ................. G01B 3/1056 33/758
1,726,960 A * 9/1929 Langsner ............. G01B 3/1071 33/758
1,798,476 A * 3/1931 Langsner ............. G01B 3/1056 33/758
2,349,670 A 5/1944 Moxey
3,577,641 A 5/1971 Smith
4,700,489 A * 10/1987 Vasile .................... G01B 3/566 324/67
4,702,012 A * 10/1987 Miller ...................... B25H 7/00 33/427
4,908,954 A * 3/1990 Johnson ............... G01B 3/1071 33/768
4,965,944 A * 10/1990 Kuze ...................... G01B 3/563 33/760
4,967,482 A * 11/1990 Hoover ................ G01B 3/1071 33/484

(Continued)

FOREIGN PATENT DOCUMENTS

GB 2314932 A * 1/1998 ........... G01B 3/1041
JP H01267100 A 10/1989

(Continued)

*Primary Examiner* — George B Bennett
(74) *Attorney, Agent, or Firm* — Argus Intellectual Enterprise; Jordan Sworen; Daniel Enea

(57) ABSTRACT

A multi-purpose measuring tool is provided. The tool includes a compact housing having two parallel lateral sidewalls, one of which includes a clip for attachment to a belt or bag. A tape measure extends from the front side of the housing and is retractably stored therein. The distal end of the tape measure is fitted with a two-pronged hook that allows for precise circular measurements. An opening in the hook allows a writing utensil to mark a workpiece. The tool further incorporates a square angle bracket on the housing for alignment during cutting operations, while the edge of the tape measure can be used as a straight ruler. Additionally, the base of the tool includes a puncturing member designed for tasks such as opening insulation or cardboard boxes.

15 Claims, 5 Drawing Sheets

(56) References Cited

U.S. PATENT DOCUMENTS 5,020,235 A * 6/1991 Martin ................. G01B 3/1071 33/670
6,047,481 A * 4/2000 Bond ..................... G01B 3/566 33/761
6,082,014 A * 7/2000 Beyers ..................... B44D 3/38 33/413
6,098,303 A * 8/2000 Vogel ................... G01B 3/1071 33/759
6,115,931 A * 9/2000 Arcand ................ G01B 3/1071 33/768
6,370,790 B1 * 4/2002 Stenger ................ G01B 3/1056 33/770
6,497,050 B1 12/2002 Ricalde
6,938,354 B2 * 9/2005 Worthington ............ C12N 9/88 33/768
7,055,260 B1 * 6/2006 Hoffman .............. G01B 3/1056 33/759
7,191,530 B1 3/2007 Thibodeaux
8,464,436 B2 * 6/2013 Smith .................. G01B 3/1005 33/760
8,601,710 B2 * 12/2013 Huang ................. G01B 3/1056 33/768
8,819,950 B1 * 9/2014 Lemcke ................... B44D 3/38 33/413
9,032,639 B2 * 5/2015 Murray ................ G01B 3/1071 33/770
9,086,265 B2 7/2015 Kocenko
9,303,967 B2 * 4/2016 Kuo ..................... G01B 3/1056
11,333,477 B2 5/2022 Deutscher
11,499,809 B2 * 11/2022 Herritz ...................... A61F 5/08
12,595,994 B2 * 4/2026 Rizvi ................... G01B 3/1007
2007/0214674 A1 * 9/2007 Erisoty ................ G01B 3/1084 33/761
2009/0271999 A1 11/2009 Alker
2012/0073152 A1 * 3/2012 McGahan ............ G01B 3/1084 33/760
2025/0020442 A1 * 1/2025 Meeks ................. G01B 3/1056
2026/0194335 A1 * 7/2026 Hart ..................... G01B 3/1056

FOREIGN PATENT DOCUMENTS

JP 2001205984 A 7/2001
JP 2012008112 A 1/2012

* cited by examiner

MULTI-PURPOSE MEASURING TOOL

BACKGROUND OF THE INVENTION

The present invention relates to measuring tools. The present invention further provides a multi-purpose measure tool that integrates multiple functionalities, including a tape measure, a two-pronged hook for circle drawing, a square angle for precise cutting, a sheet metal aligner, and a puncturing member.

In various industries and professions, including construction, metalworking, and general DIY projects, workers often need to carry multiple tools to perform basic measuring and cutting tasks. For instance, workers typically carry a tape measure, a ruler, a hook for drawing circles, and other tools for cutting and aligning materials like sheet metal. This results in inefficiencies, as carrying and managing multiple tools can be cumbersome and time-consuming. Additionally, the frequent switching between tools increases the risk of accidents, tool misplacement, or damage, especially in busy or confined work environments.

Conventional measuring tools are often limited in functionality, serving a single purpose, such as measuring length or drawing straight lines. These traditional tools do not integrate additional features like circle drawing or sheet metal alignment, requiring users to purchase, carry, and switch between separate tools. Moreover, some tools lack ergonomic or safety considerations, increasing the potential for injury during tasks such as cutting or puncturing materials.

There is a need for a multi-functional tool that combines common measuring and cutting functions into a single, portable device, providing users with increased convenience, safety, and efficiency. Such a tool should allow for precise measurement, marking, and cutting tasks, while reducing the number of tools that need to be carried. The present invention addresses these needs by providing a multi-purpose measuring tool that integrates multiple functionalities, including a tape measure, a hook for circle drawing, a square angle for precise cutting, a sheet metal aligner, and a puncturing member.

In light of the devices disclosed in the known art, it is submitted that the present invention substantially diverges in design elements and methods from the known art and consequently it is clear that there is a need in the art for an improvement for a multi-purpose measuring tool. In this regard the instant invention substantially fulfills these needs.

SUMMARY OF THE INVENTION

In view of the foregoing disadvantages inherent in the known types of measuring tools now present in the known art, the present invention provides a new multi-purpose measuring tool that integrates multiple functionalities, including a tape measure, a hook for circle drawing, a square angle for precise cutting, a sheet metal aligner, and a puncturing member.

It is an objective of the present invention to provide a multi-purpose measuring tool that integrates several commonly used tools into a single, compact housing. This tool is designed to improve efficiency by allowing users to perform multiple functions, such as measuring, marking, and cutting, without the need to switch between separate instruments. The combination of these functions in a single device reduces the number of tools required for common tasks, simplifying the workflow and minimizing clutter in the work environment.

It is an objective of the present invention to provide a multi-purpose measuring tool that features a retractable tape measure with an integrated two-pronged hook attachment. This hook attachment allows for the precise drawing of circles or arcs on a drawing surface, facilitated by an opening through which a writing utensil can pass. The attachment ensures stability and accuracy in drawing, supported by the two-pronged hook that contacts the surface, making it suitable for various drafting and layout tasks.

It is an objective of the present invention to provide a multi-purpose measuring tool that incorporates a square angle feature for assisting in cutting operations. The square angle, formed by the base and lateral sidewalls of the housing, ensures accurate alignment when cutting materials such as sheet metal. This feature enhances the precision of cuts by allowing users to follow original cuts or factory edges with minimal deviation, reducing errors in manual cutting tasks.

It is an objective of the present invention to provide a multi-purpose measuring tool equipped with a built-in sheet metal aligner. This aligner allows the user to smooth and align sheet metal after machining, removing distortions and ensuring a consistent surface.

It is an objective of the present invention to provide a multi-purpose measuring tool with a puncturing member at the base, designed for tasks such as opening insulation or cardboard boxes. The puncturing member is formed from a rigid, tapered material with a sharp point, enabling efficient penetration and cutting of various materials. This feature adds further utility to the tool by enabling it to perform functions typically associated with a knife or box cutter.

It is an objective of the present invention to provide a multi-purpose measuring tool with a clip attached to one of the lateral sidewalls, enabling convenient transport and storage. The clip allows the tool to be securely attached to a belt, pocket, or bag, ensuring that it is readily accessible when needed. This feature increases the portability of the tool and make it ideal for on-the-go tasks in various work environments.

It is therefore an object of the present invention to provide a new and improved multi-purpose measuring tool that has all of the advantages of the known art and none of the disadvantages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
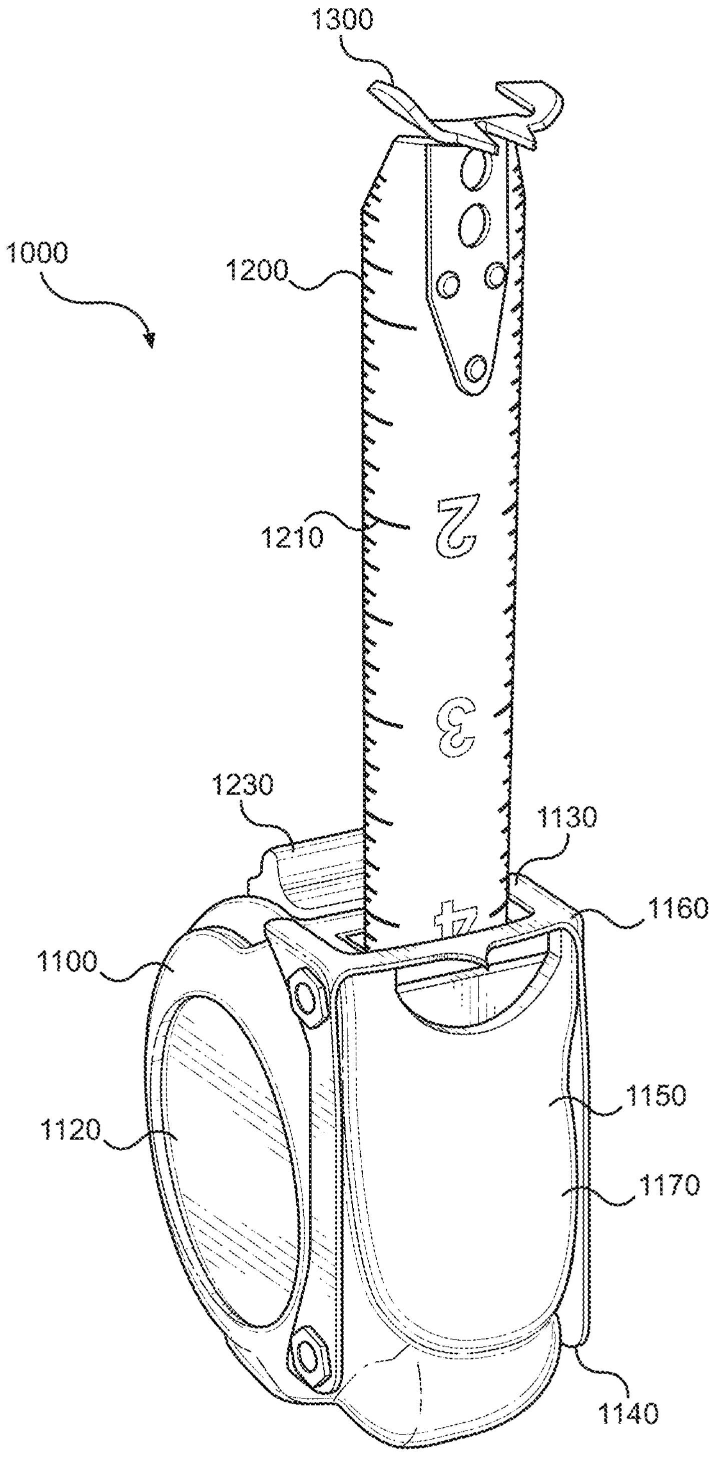
FIG. 1 shows a perspective view of an embodiment of the multi-purpose measuring tool.

Reference is made herein to the attached drawings. Like reference numerals are used throughout the drawings to depict like or similar elements of the multi-purpose measuring tool. For the purpose of presenting a brief and clear description of the present invention, the embodiment discussed will be as used for measuring, cutting, and designing at a worksite. The figures are intended for representative purposes only and should not be considered to be limiting in any respect.

Reference will now be made in detail to the exemplary embodiment(s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment" does not necessarily refer to the same embodiment.

Referring now to FIG. 1, there is shown a perspective view of an embodiment of the multi-purpose measuring tool. The multi-purpose measuring tool 1000 comprises a housing 1100, which serves as the primary body for enclosing and supporting the tape measure 1200 and various other functional elements. The housing 1100 is generally cylindrical with two parallel lateral sidewalls 1120 that define the opposing sides of the tool 1000, and a front side 1130 from which the tape measure 1200 extends. In this view, the housing 1100 is resting on its rear side 1140, with the base 1150 facing forward.

The tape measure 1200 is partially extended from the front side 1130 of the housing 1100, showing measurement markings 1210 along its length. The tape measure 1200 is retractably stored within the housing 1100 and can be fully extended or retracted as needed by the user. A locking mechanism 1230 is disposed on the exterior of the housing 1100 and is configured to apply friction to a portion of the tape measure disposed within the housing 1100. In this way, the user can selectively hold an extended position of the tape measure. A retracting member (as seen in FIGS. 2, 1240) is also disposed on an exterior of the housing 1100 and allows the user to retract portion of extended tape measure after the locking mechanism 1230 has been activated.

Figure 5:
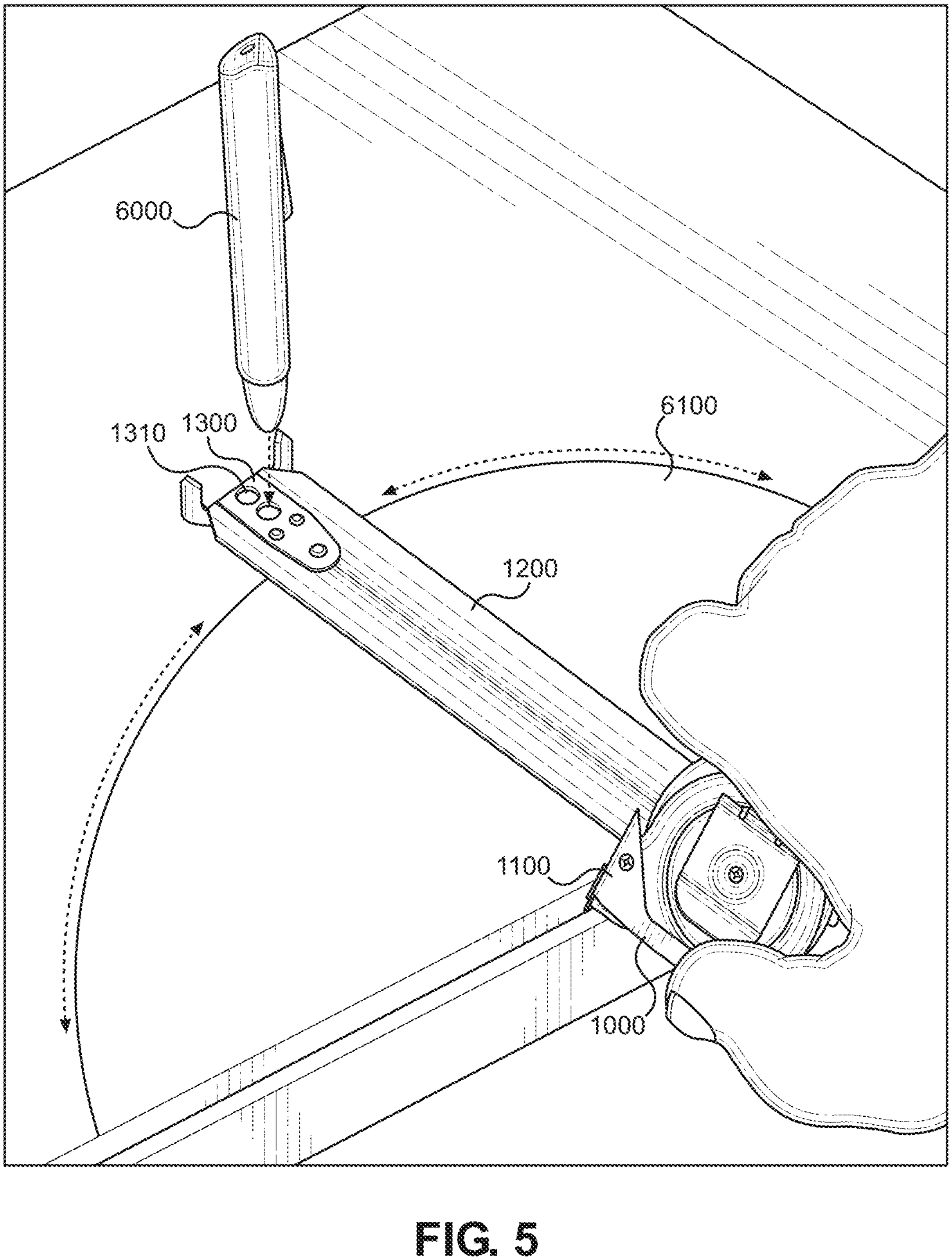
FIG. 5 shows a perspective view of an embodiment of the multi-purpose measuring tool in use.

At the distal end of the tape measure 1200 is a two-pronged hook attachment 1300, which is configured to aid in the drawing of arcs and circles. The two-pronged hook 1300 extends towards the base 1150, and its structure is designed to provide stable contact with the drawing surface (as seen in FIG. 5). The two-pronged hook comprises a pair of sharp teeth extending towards the base and a pair of winged arms extending towards the upper end of the housing, wherein a channel extends through the pair of winged arms. The configuration of the winged arms allows a user to easily retract the tape measure from the housing by creating a grasping space between the arms and the housing. In the illustrated embodiment, the pronged teeth are positioned between the pair of winged arms.

In the shown embodiment, a square angle bracket 1160 is coupled to the housing to cooperatively form a square angle via a flat base 1150 and a front side of the square angle bracket 1160. The tool is used as an alignment aid for cutting operations wherein, the square angle 1160 provides a precise 90-degree reference for aligning cutting materials such as sheet metal. Additionally, a puncturing member 1400 extends downward from the square angle bracket 1160 towards the base and is designed to puncture materials like insulation or open cardboard boxes. In the shown embodiment, the square angle bracket 1160 includes a pair of fasteners that secure the bracket 1160 to the housing. These fasteners also allow for adjustment of the bracket 1160 to the housing 1100 to achieve a perpendicular angle.

Figure 2:
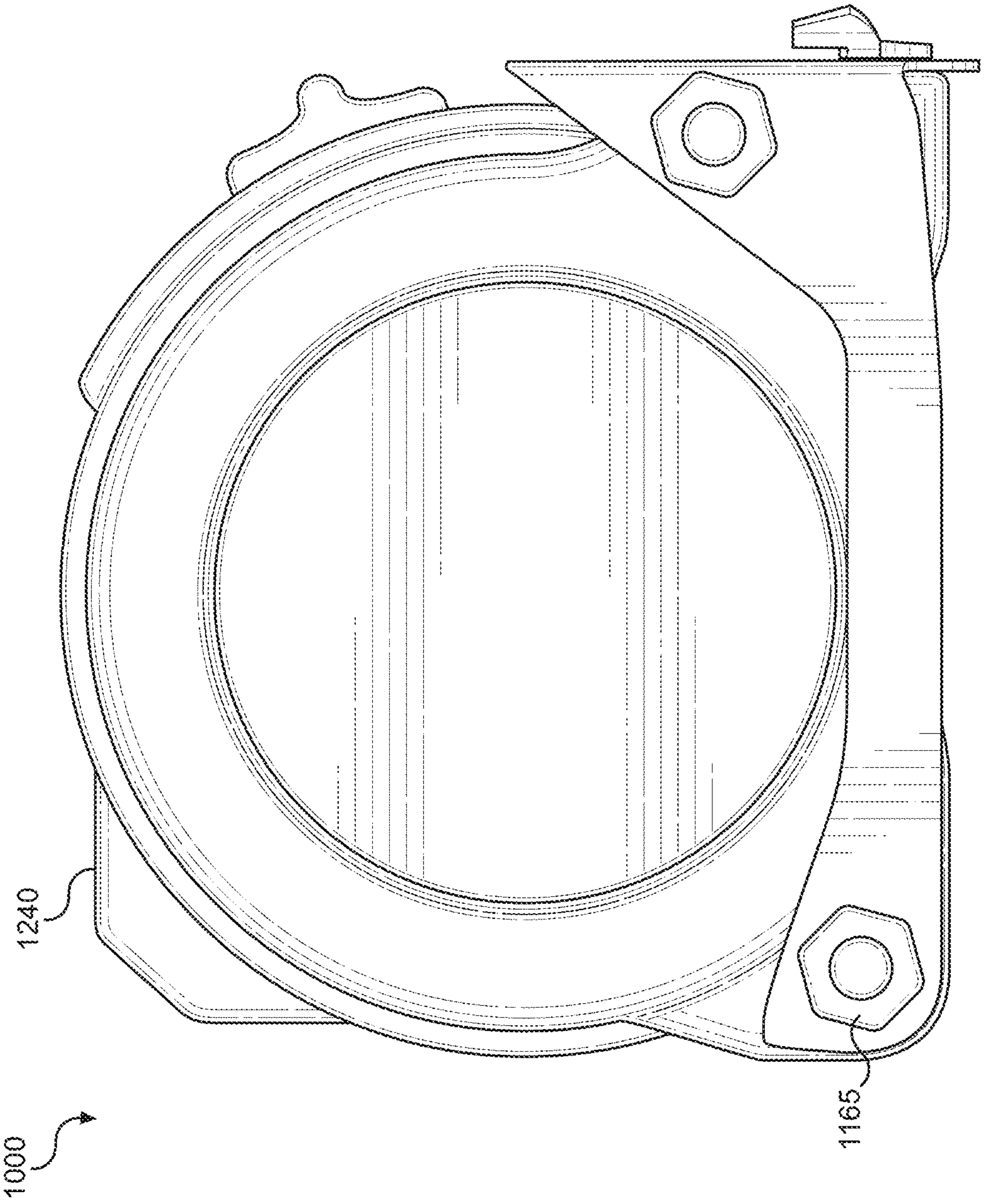
FIG. 2 shows a first side view of an embodiment of the multi-purpose measuring tool.
Figure 3:
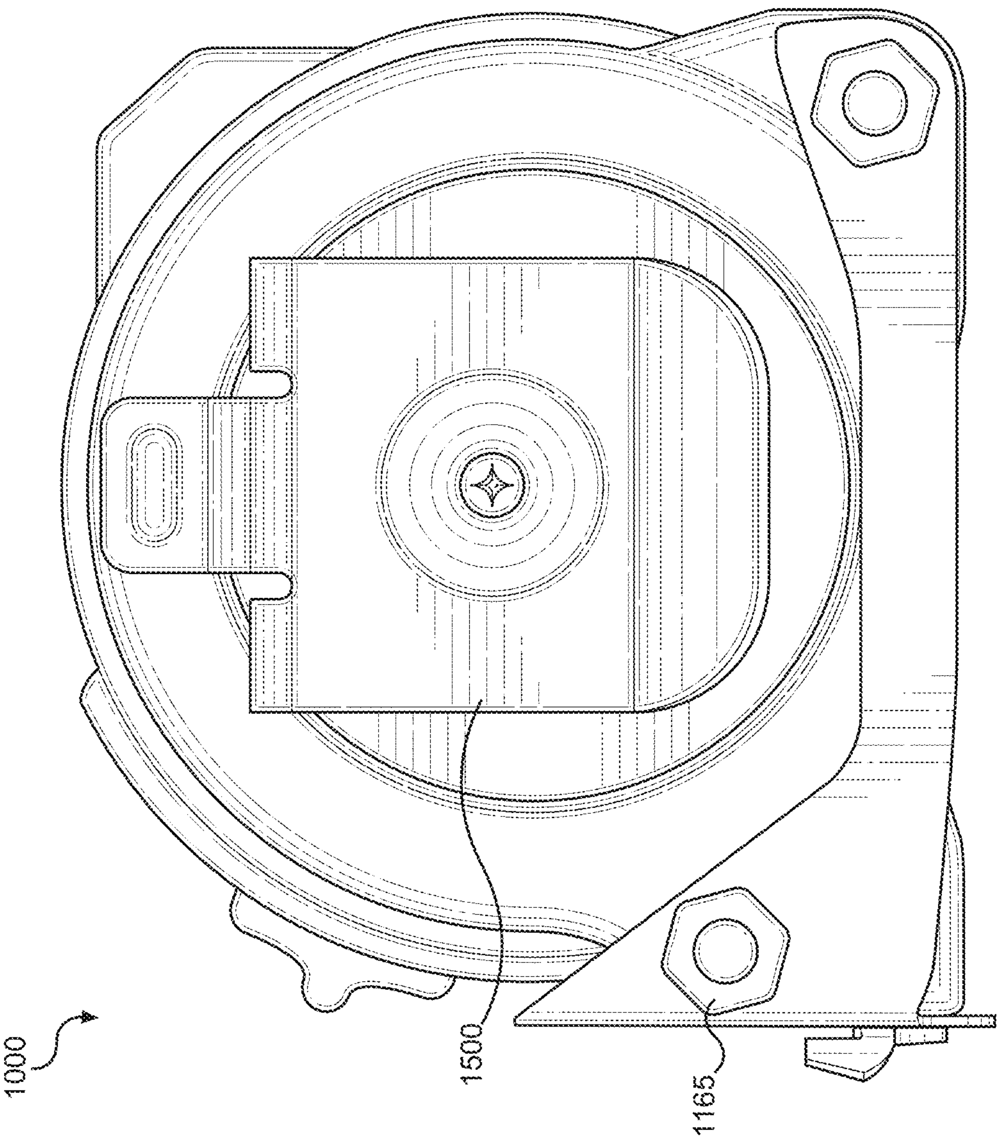
FIG. 3 shows a second side view of an embodiment of the multi-purpose measuring tool.

Referring now to FIGS. 2 and 3, there are shown side views of an embodiment of the multi-purpose measuring tool. A first lateral sidewall 1120 of the housing 1100 is shown without the clip. The housing 1100 has a generally rectangular shape with rounded edges, providing a comfortable grip for the user. The flat base 1150 is visible at the bottom of the tool, which forms a square angle 1160 with the lateral sidewall 1120. This square angle is designed to assist in alignment during cutting tasks. In the illustrated embodiment, the square angle 1160 is removably secured to the housing via a plurality of fasteners 1650. The square angle 1160 comprises a rectangular shape having a central opening designed to receive the housing 1100 therethrough. In alternate embodiments, the square angle is integrated with the housing.

FIG. 3 shows the opposing side view of the tool, with the tape measure 1200 retracted into the housing 1100, similar to FIG. 2. However, in this view, the clip 1500 attached to the lateral sidewall 1120 is visible. The clip 1500 allows the multi-purpose measuring tool 1000 to be attached securely to a belt, pocket, or bag for easy transport. The clip is affixed near the upper portion of the housing and provides sufficient tension to hold the tool securely while also allowing for quick release when needed.

Figure 4:
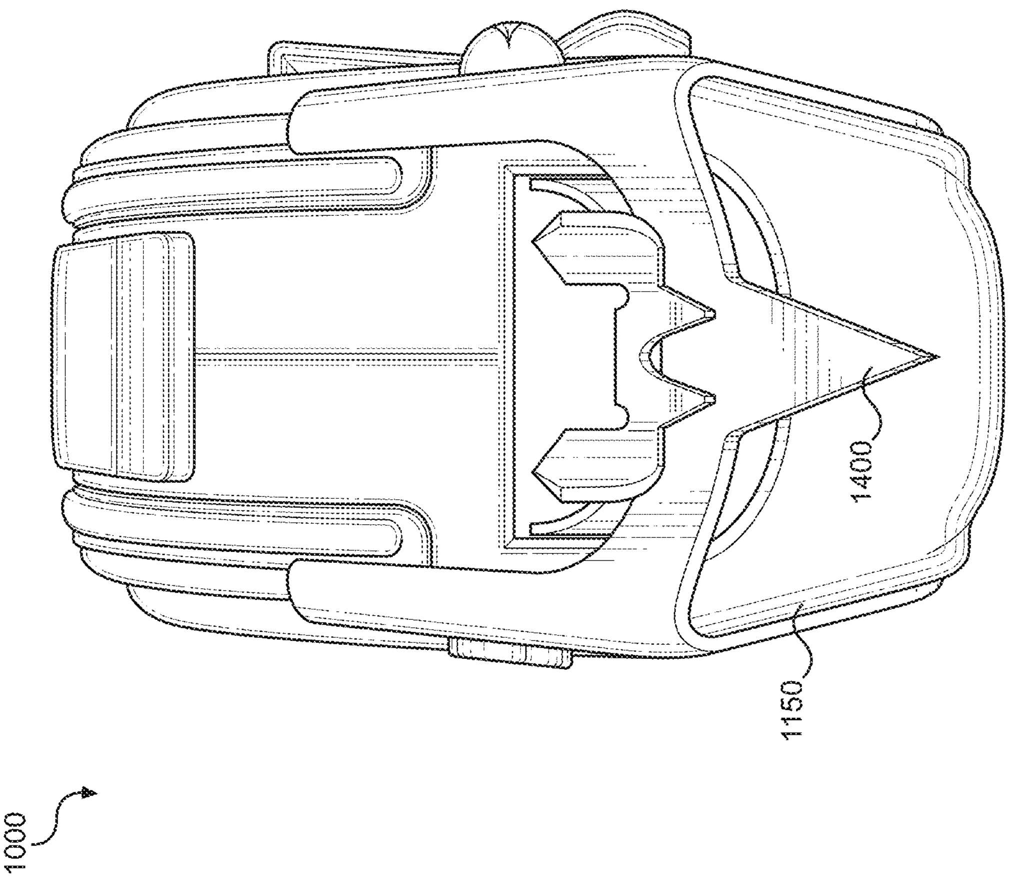
FIG. 4 shows a bottom perspective view of an embodiment of the multi-purpose measuring tool.

Referring now to FIG. 4, there is shown a bottom perspective view of an embodiment of the multi-purpose measuring tool. The base 1150 of the tool 1000 is configured to provide stability when the tool 1000 is placed on a surface. The puncturing member 1400 is shown extending from the base 1150. This puncturing member 1400 is rigid and tapered, terminating in a sharp point designed for puncturing materials such as insulation or for use in opening cardboard boxes. The puncturing member 1400 adds another layer of functionality to the tool, making it versatile for tasks that require a cutting or piercing tool.

Referring now to FIG. 5, there is shown a perspective view of an embodiment of the multi-purpose measuring tool in use. FIG. 5 illustrates the multi-purpose measuring tool 1000 in use, demonstrating its functionality for drawing arcs or curves on a drawing surface. In this view, the tape measure 1200 is shown extended from the housing 1100, with the two-pronged hook attachment 1300 positioned on the surface where the marking is to be made.

The two-pronged hook attachment 1300 is located at the distal end of the tape measure 1200. The two-pronged hook 1300 extends downward towards the base 1010 and is configured to contact a drawing surface when the tape measure 1200 is extended. This hook enables the user to draw accurate circles and arcs by using the tool as a compass. An opening 1310 is located through the two-pronged hook 1300, allowing a writing utensil 6000 to pass through the hook 1300 and tape measure 1200, marking the drawing surface 6100 while ensuring stability. The tape measure 1200, with its graduated measurement markings, assists the user in ensuring accurate distances and dimensions while drawing. The housing 1100 remains in the user's hand or can be rested on a nearby surface during this operation, providing additional control over the length of the extended tape measure 1200. In this way, the tool 1000 is adapted to function not only as a traditional measuring device but also as a compass or hook, allowing for the accurate creation of arcs or circles without the need for additional drawing tools.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A multi-purpose measuring tool, comprising:
- a housing including a front side and a pair of lateral side walls;
- a tape measure retractably stored within the housing and extendable from the front side thereof;
- wherein a distal end of the tape measure comprises a two-pronged hook, wherein the two-pronged hook extends towards a base of the housing;
- an opening extending through the two-pronged configured to allow a writing utensil to pass through the tape measure onto a surface of a workpiece, wherein the distal end of the tape measure is configured to be supported by the two-pronged hook when in contact with the workpiece;
- a square angle bracket disposed at a lower end of the housing, wherein the square angle bracket is configured to align the front side of the housing perpendicular to an edge of the workpiece;
- a puncturing member extending from the square angle bracket, the puncturing member having a sharp point configured to puncture insulation and cardboard.

2. The multi-purpose measuring tool of claim 1, further comprising a clip extends from one of the pair of lateral sidewalls.

3. The multi-purpose measuring tool of claim 1, wherein the tape measure is configured to function as a straight edge ruler when extended.

4. The multi-purpose measuring tool of claim 1, further comprising a sheet metal aligner disposed on the base the housing, wherein the sheet metal aligner is configured to smooth and align sheet metal surfaces.

5. The multi-purpose measuring tool of claim 1, wherein the puncturing member is removably attachable to the square angle bracket, allowing for replacement or sharpening of the puncturing member.

6. The multi-purpose measuring tool of claim 2, wherein the clip is configured to swivel to allow attachment in various orientations relative to a user's belt or bag.

7. The multi-purpose measuring tool of claim 1, wherein the housing further comprises a locking mechanism for the tape measure, configured to lock the tape measure in an extended position during use.

8. The multi-purpose measuring tool of claim 1, wherein the base of the housing comprises a non-slip surface to provide stability when the tool is placed on a working surface.

9. The multi-purpose measuring tool of claim 1, wherein the housing further comprises an indicator marking located at the square angle, configured to assist the user in verifying accurate alignment during cutting operations.

10. The multi-purpose measuring tool of claim 1, wherein the two-pronged hook comprises a pair of sharp teeth extending towards the base and a pair of winged arms extending towards an upper end of the housing.

11. The multi-purpose measuring tool of claim 10, wherein a channel extends through the pair of winged arms.

12. The multi-purpose measuring tool of claim 11, wherein the pronged teeth are positioned between the pair of winged arms.

13. The multi-purpose measuring tool of claim 1, wherein the square angle bracket comprises a rectangular shape having a central opening designed to receive the housing therethrough.

14. The multi-purpose measuring tool of claim 13, wherein the square angle bracket is removably secured to the housing.

15. The multi-purpose measuring tool of claim 14, wherein the puncturing member is centrally disposed on a front side of the square angle bracket and in vertical alignment with the two-pronged hook.

* * * * *